United States Patent

Boardman et al.

[15] 3,639,255

[45] Feb. 1, 1972

[54] PROCESS OF DISPERSING OIL SLICKS

[72] Inventors: Guy Boardman; Fred Dawson, both of Manchester, England

[73] Assignee: Imperial Chemical Industries Limited, London, England

[22] Filed: Apr. 24, 1968

[21] Appl. No.: 723,881

[30] Foreign Application Priority Data

May 3, 1967 Great Britain .................... 20,589/67

[52] U.S. Cl. ................................ 252/312, 210/59, 252/351
[51] Int. Cl. ......................................... B01j 13/00
[58] Field of Search ........................ 252/312, 351; 210/59

[56] References Cited

UNITED STATES PATENTS

| | | | |
|---|---|---|---|
| 1,970,578 | 8/1934 | Schoeller et al. | 260/458 |
| 3,284,352 | 11/1966 | Burdyn et al. | 252/8.5 |

OTHER PUBLICATIONS

Chemical Engineering, May 22, 1967, pg. 112

*Primary Examiner*—John D. Welsh
*Attorney*—Cushman, Darby & Cushman

[57] ABSTRACT

A process of dispersing oil slicks on natural water areas using a water-insoluble condensate of 1 mole of monohydric aliphatic alcohol having 11 to 20 carbon atoms (or mixtures) with from 1.5 to 6.0 moles of ethylene oxide as an emulsifier is disclosed.

6 Claims, No Drawings

PROCESS OF DISPERSING OIL SLICKS

This invention relates to a process for the preparation of oil-in-water emulsions, and more particularly to the preparation of oil-in-water emulsions using an emulsifying agent which is soluble in oil but substantially insoluble in water.

It has hitherto been considered advisable when preparing oil-in-water emulsions that the emulsifying agent should be water soluble, but we have now found that stable emulsions can be obtained using certain condensation products of long chain aliphatic alcohols with ethylene oxide, which are soluble in oil but substantially insoluble in water.

According to the present invention there is provided a process for the preparation of oil-in-water emulsions which comprises adding to the water and oil as emulsifying agent a condensation product of 1 mol of a long chain aliphatic alcohol or 1 mol of a mixture of long chain aliphatic alcohols with from 1.5 to 6.0 mols of ethylene oxide, and then gently agitating the mixture.

By long chain aliphatic alcohols we mean those aliphatic alcohols which contain from 11 to 20 carbon atoms, and which may be saturated or unsaturated. As examples of long chain aliphatic alcohols which may be condensed with ethylene oxide to give emulsifying agents suitable for use in the present invention there may be mentioned cetyl, oleyl, lauryl, myristyl, and stearyl alcohols and mixtures of these. It is preferred to use a mixture of cetyl and oleyl alcohols.

Although condensates of from 1.5 to 6.0 mols of ethylene oxide per mol of aliphatic alcohol or mixture of alcohols may be used as emulsifying agents in the present invention, it is preferred to use condensates of from 2.0 to 4.0 mols of ethylene oxide per mol of alcohol or mixture of alcohols. A particularly preferred emulsifying agent is the condensation product of 3.5 molecular proportions of ethylene oxide with one molecular proportion of a mixture of cetyl and oleyl alcohols.

As examples of the oils which may be emulsified in water using the emulsifying agents of this invention there may be mentioned crude unrefined natural petroleum oil and any of the mainly involatile refined derivatives thereof, for example, lubricating oils, diesel oil, and gas oil, but the invention is not restricted to the emulsification of these oils only.

The emulsifying agents of the present invention may be added to the oil and water in their concentrated form or as solutions in suitable solvents, for example solvent naphtha, xylene, or light oil distillates. The use of solvents is advantageous in that the time required to mix the agent with the oil is considerably reduced.

The emulsifying agents as defined above are equally effective in fresh water and in sea water, and they are particularly useful in dispersing patches or "slicks" of oil which may have been discharged at sea or in harbors, rivers, and lakes, for example, as a result of accident. The natural wave action of the sea gives sufficient agitation to maintain the oil in emulsion after addition of an emulsifying agent of the present invention. The emulsifying agents being readily soluble in oils but virtually insoluble in water, are not extracted from the oil phase even by constant agitation in the presence of extremely large quantities of water, so that the oil remains emulsified for long periods of time.

Crude oil frequently contains volatile components which will be lost by evaporation when the oil is spread as a layer over a water surface. Under these conditions up to 25 percent of the weight of crude oil can be readily lost and the residual heavy oil fractions are generally more difficult to emulsify than the original crude. However, such heavy residual oils can still be emulsified by the substantially water-insoluble emulsifying agents used in the process of the present invention, although larger quantities of the agent may be required.

The heavy oil fraction remaining on the surface of water after the more volatile components have evaporated can also take up some of the water to form a stable water-in-oil emulsion. This situation is particularly likely to occur when the water is sea water and under conditions of continuous turbulence. The inverted emulsion so obtained has all the undesirable characteristics of the oil itself and it is more difficult to reemulsify such emulsions into water. However, when an emulsifying agent as used in the process of the present invention is mixed with a water-in-oil emulsion spread over the surface of sea water, the water-in-oil emulsion either reverses to the desired oil-in-water type or there is obtained a multiple phase emulsion in which the droplets of oil have emulsified in them much smaller droplets of water. Again, more emulsifying agent is necessary to produce a stable oil-in-water emulsion or a multiple phase emulsion from a water-in-oil emulsion than is necessary for the emulsification of neat crude oil, but even under these adverse conditions the quantity required is only 10–12 percent by weight calculated on the weight of oil.

The insolubility of the emulsifying agents has a further advantage in that they have a much reduced toxic effect on aquatic life compared with the water-soluble detergents which have previously been used in the dispersion of oil slicks at sea or on fresh water.

A still further advantage in the use of emulsifying agents as defined above is that they are biologically "soft," that is they can be gradually degraded by natural bacterial action and thus will be entirely consumed in course of time, as will the oil which has been emulsified.

The invention is illustrated by not limited by the following examples in which the parts are by weight.

EXAMPLE 1

One hundred parts of crude oil having a specific gravity of 0.8 were added to 1,000 parts of sea water contained in a shallow vessel. 7.5 parts of the condensation product of 3.5 molecular proportions of ethylene oxide with one molecular proportion of mixed cetyl-oleyl alcohols were added and the mixture was gently agitated. As the emulsifying agent dissolved in the oil an emulsion of the oil in the water was obtained. The emulsified oil was allowed to rise to the surface of the mixture and the lower layer of sea water was removed and replaced by an equal volume of fresh sea water. On gentle agitation the emulsified oil readily redispersed in the sea water. This operation was repeated until six cycles had been carried out, and at the end of the final cycle, the oil emulsion was as good and as stable as in the first cycle.

EXAMPLE 2

The operations described in example 1 were repeated except that the emulsifying agent was first dissolved in an equal weight of solvent naphtha. The time required to mix the agent into the oil layer was considerably reduced, and the results were exactly the same as in example 1.

EXAMPLE 3

7.5 parts of the emulsifying agent used in example 1 were added to 1,000 parts of sea water contained in a shallow vessel and the mixture was gently agitated. As the emulsifying agent is not soluble in water, a thin layer of the agent was obtained on the surface of the water. One hundred parts of crude oil having a specific gravity of 0.8 were then added and the mixture was gently agitated. The oil rapidly dissolved in the surface layer of emulsifying agent and was emulsified into the water giving an emulsion very similar in behavior to that obtained in example 1.

EXAMPLE 4

Two hundred parts of Kuwait crude oil were distilled at a temperature up to 240° C., when 30 percent by weight of the more volatile material was removed. Fifty parts of the residual heavier oil were poured on to 500 parts of sea water contained in a rectangular trough to give an oil layer 0.45 cm. thick. A solution in 4.5 parts of naphtha of 4.5 parts of the emulsifying agent used in example 1 was added. After gentle agitation of the mixture for a few minutes all the oil was emulsified into the sea water. The mixture was then left undisturbed for 3 hours, after which time the emulsion had risen to the surface of the water as a creamy layer which on gentle agitation of the mixture readily redispersed in the water.

EXAMPLE 5

To 50 parts of the heavy oil fraction remaining after distilling off the volatile components from Kuwait crude oil as described in example 4 were added 7.5 parts of sea water under the action of a high speed agitator to give a stable water-in-oil emulsion in which the emulsified water droplets were from 1 to 30 microns in diameter as determined by microscopic examination. This water-in-oil emulsion was poured on to 500 parts of sea water contained in a rectangular trough as described in example 4 and a solution in 5.5 parts of naphtha of 5.5 parts of the emulsifying agent used in example 1 was added. After gently agitating the mixture for 35 minutes all the oil was emulsified into the water and microscopic examination of the emulsion revealed that oil droplets of from 5 to 50 microns diameter were present together with some droplets having diameters up to 150 microns in which water was still emulsified. After standing undisturbed for 2 to 3 hours the emulsion rose to the surface of the water as a creamy layer which readily redispersed again on resumption of gentle agitation.

What we claim is:

1. A process for the dispersion of oil slicks consisting of crude unrefined natural petroleum oil and any of the mainly involatile refined derivatives thereof, on expanses of natural water which comprises adding to the water and oil, as emulsifying agent, an effective amount of an oil-soluble, essentially water-insoluble condensation product of 1 molecular proportion of a monohydric aliphatic alcohol having from 11 to 20 carbon atoms or mixture of such alcohols making up said molecular proportion, with from 1.5 to 6.0 molecular proportions of ethylene oxide whereby an oil-in-water emulsion is formed.

2. A process as claimed in claim 1 wherein the emulsifying agent is the condensation product of a mixture of cetyl alcohol and oleyl alcohol with ethylene oxide.

3. A process as claimed in claim 1 wherein the emulsifying agent is the condensation product of 1 molecular proportion of said alcohol with from 2.0 to 4.0 molecular proportions of ethylene oxide.

4. A process as claimed in claim 1 wherein the emulsifying agent is the condensation product of 3.5 molecular proportions of ethylene oxide with one molecular proportion of a mixture of cetyl and oleyl alcohols.

5. A process as claimed in claim 1 wherein the emulsifying agent is used in conjunction with a solvent therefore selected from the group consisting of solvent naphtha, xylene and light oil distillates.

6. A process as claimed in claim 1 wherein the mixture of water, oil and emulsifying agent is subjected to mechanical agitation to increase the rate of emulsification.

* * * * *